US012623668B2

(12) United States Patent
Cope et al.

(10) Patent No.: US 12,623,668 B2
(45) Date of Patent: May 12, 2026

(54) DISTRACTED DRIVING SYSTEMS AND METHODS FOR DETECTION, ALERTING, AND CORRECTION

(71) Applicant: State Farm Mutual Automobile Insurance Company, Bloomington, IL (US)

(72) Inventors: Craig Cope, Bloomington, IL (US); Seth L. Corin, Cumming, GA (US); Megan Hucek, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 28 days.

(21) Appl. No.: 18/664,591

(22) Filed: May 15, 2024

(65) Prior Publication Data

US 2025/0026356 A1 Jan. 23, 2025

Related U.S. Application Data

(60) Provisional application No. 63/528,119, filed on Jul. 21, 2023.

(51) Int. Cl.
B60W 40/08 (2012.01)
B60W 50/14 (2020.01)
B60W 60/00 (2020.01)
H04W 4/46 (2018.01)

(52) U.S. Cl.
CPC ............ B60W 40/08 (2013.01); B60W 50/14 (2013.01); B60W 60/0051 (2020.02); H04W 4/46 (2018.02); B60W 2520/10 (2013.01); B60W 2554/80 (2020.02); B60W 2556/65 (2020.02)

(58) Field of Classification Search
CPC ............ B60W 40/08; B60W 60/0051; B60W 50/14; B60W 2556/65; B60W 2554/80; B60W 2520/10; H04W 4/46
USPC ......................................................... 340/576
See application file for complete search history.

(56) References Cited

U.S. PATENT DOCUMENTS

| | | |
|---|---|---|
| 9,830,748 B2 | 11/2017 | Rosenbaum |
| 9,990,782 B2 | 6/2018 | Rosenbaum |
| 10,269,190 B2 | 4/2019 | Rosenbaum |
| 10,467,489 B2 | 11/2019 | Yokota et al. |
| 10,467,824 B2 | 11/2019 | Rosenbaum |
| 10,654,414 B1 | 5/2020 | Csabi et al. |
| 10,769,461 B2 | 9/2020 | Madkor et al. |

(Continued)

FOREIGN PATENT DOCUMENTS

| | | |
|---|---|---|
| EP | 3239686 A1 | 11/2017 |
| EP | 3578433 B1 | 8/2020 |

(Continued)

*Primary Examiner* — Naomi J Small
(74) *Attorney, Agent, or Firm* — Armstrong Teasdale LLP

(57) ABSTRACT

A computer system is provided and is programmed to: (1) receive sensor data associated with a primary vehicle; (2) determine a current condition of a driver of the primary vehicle based upon the sensor data of the primary vehicle; (3) determine a threat level for the primary vehicle based upon the current condition of the driver of the primary vehicle and the sensor data of the primary vehicle; (4) activate at least one action in the primary vehicle based upon the threat level for the primary vehicle; and/or (5) electronically transmit the threat level of the primary vehicle to one or more additional vehicles.

20 Claims, 7 Drawing Sheets

(56)  References Cited

U.S. PATENT DOCUMENTS

| | | | |
|---|---|---|---|
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 11,820,386 B1 | 11/2023 | Carrasco et al. | |
| 2017/0243485 A1* | 8/2017 | Rubin | H04W 4/46 |
| 2019/0111945 A1* | 4/2019 | Wiegand | B60K 35/231 |
| 2019/0144003 A1 | 5/2019 | Hyuga et al. | |
| 2019/0147266 A1 | 5/2019 | Aizawa et al. | |
| 2021/0380115 A1* | 12/2021 | Alpert | G06V 20/50 |
| 2021/0394677 A1* | 12/2021 | Katagiri | B60R 1/001 |
| 2022/0076040 A1 | 3/2022 | Delahaye | |
| 2022/0092893 A1 | 3/2022 | Rosenbaum | |
| 2022/0108602 A1* | 4/2022 | Kathuria | G08G 1/0112 |
| 2022/0340148 A1 | 10/2022 | Rosenbaum | |
| 2023/0060300 A1 | 3/2023 | Rosenbaum | |
| 2023/0166743 A1* | 6/2023 | Heck | G06N 3/044 |
| 2024/0005678 A1 | 1/2024 | Hassan et al. | |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

* cited by examiner

DISTRACTED DRIVING SYSTEMS AND METHODS FOR DETECTION, ALERTING, AND CORRECTION

CROSS-REFERENCE TO RELATED APPLICATIONS

This application claims priority to U.S. Provisional Patent Application No. 63/528,119, filed Jul. 21, 2023, the entire content and disclosure of which are hereby incorporated herein by reference in its entirety.

FIELD OF USE

The present disclosure relates to detecting distracted driving and, more particularly, to a network-based system and method for detecting distracted driving and, after detecting the distracted driving, one or more of alerting the driver in question and nearby drivers and/or auto-correcting the vehicle of the distracted driver or the vehicles of the nearby drivers.

BACKGROUND

Driving while engaging in another activity that takes the driver's attention away from driving (e.g., using a phone or "texting," or eating or tuning the radio) is referred to as "distracted driving" and may result in a motor vehicle crash. In some jurisdictions, distracted driving may be illegal. Distracted driving is a major cause of crashes and fatalities on the road and impacts thousands of people each year. Distracted driving behaviors may include some form of hand activity that does not include controlling the steering wheel. Examples may include cell phone usage, eating, drinking, shaving, application of makeup or grooming, entering GPS system data, adjustment of audio or climate control systems, holding a pet, smoking behaviors such as reaching for and lighting a cigarette or activating a cigarette lighter, and/or reaching for a child.

Current automobile vehicle distracted driving prevention systems may provide in-vehicle cameras or similar sensing devices which are operated in conjunction with facial recognition software and may be generally directed to and monitor a vehicle operator's eyes. Such facial recognition systems may detect if a driver appears to be tired, falling asleep, or that the driver's eyes are not directed to the road in front of the vehicle.

Thus, while current automobile vehicle distracted driving alert systems may achieve their intended purpose, there is a need for a new and improved system and method for identifying distracted driving behavior and then taking actions to address the distracted driving. Conventional techniques may include additional ineffectiveness, inefficiencies, encumbrances, and other drawbacks as well.

BRIEF SUMMARY

The present embodiments may relate to systems and methods for detecting, alerting, and correcting distracted driving. The systems and methods described herein are configured to detect distracted driving, and, in response to that detection, taking action to address the distracted driving including alerting the distracted driver and/or nearby drivers/passengers or auto-correcting the vehicle of the distracted driver and/or the vehicles of the nearby drivers.

A distracted driving monitoring system, as described herein, may include a distracted driving monitoring ("DDM") computer device that is in communication with a mobile computer device associated with a user. The DDM computer device may be configured to a) receive sensor data associated with a primary vehicle; b) determine a current condition of a driver of the primary vehicle based upon the sensor data of the primary vehicle; c) determine a threat level for the primary vehicle based upon the current condition of the driver of the primary vehicle and the sensor data of the primary vehicle (e.g., speed, location, other vehicles in the area, etc.); d) activate at least one action in the primary vehicle based upon the threat level for the primary vehicle; and/or e) electronically transmit the threat level of the primary vehicle to one or more additional vehicles. The one or more additional vehicles may be configured to activate at least one alert action to notify a driver of the corresponding vehicle of the threat level of the primary vehicle. The at least one action may include activating at least one autonomous and/or semi-autonomous system in the primary vehicle. The at least one action may include notifying the driver of the primary vehicle to pay attention to the operation of the primary vehicle. The DDM computer device may be a vehicle controller of the primary vehicle and/or a cloud-based system in communication with the primary vehicle having a vehicle controller. The computer system may transmit the threat level of the primary vehicle to the one or more additional vehicles via vehicle to vehicle (V2V) wireless communications. The DDM computer device and/or computer system may be configured to transmit at least a portion of the sensor data to the one or more additional vehicles; and/or transmit an updated threat level to the one or more additional vehicles. The sensor data may include internal data from inside the primary vehicle and/or external data from outside of the primary vehicle. The DDM computer device and/or computer system may be configured to determine the one or more additional vehicles are positioned within a predetermined distance of the primary vehicle; and/or determine the predetermined distance of the primary vehicle relative to other vehicles based upon the speed of the primary vehicle. The DDM computing device may include additional, less, or alternate functionality, including that discussed elsewhere herein.

In one aspect, a computer system for detecting distracted driving may be provided. The computer system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the computer system comprises at least one processor in communication with at least one memory device. The at least one processor may be programmed to: (a) receive sensor data associated with a primary vehicle; (b) determine a current condition of a driver of the primary vehicle based upon the sensor data of the primary vehicle; (c) determine a threat level for the primary vehicle based upon the current condition of the driver of the primary vehicle and the sensor data of the primary vehicle; (d) activate at least one action in the primary vehicle based upon the threat level for the primary vehicle; and/or (e) electronically transmit the threat level of the primary vehicle to one or more additional vehicles. The computer system may have additional, less, or alternate functionality, including that discussed elsewhere herein.

In another aspect, a computer-based method for detecting distracted driving may be provided. The computer-based method may be implemented using one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the computer-based method may be implemented on a vehicle computer device including at least one processor in communication with at least one memory device. The method may include: (a) receiving sensor data associated with a primary vehicle; (b) determining a current condition of a driver of the primary vehicle based upon the sensor data of the primary vehicle; (c) determining a threat level for the primary vehicle based upon the current condition of the driver of the primary vehicle and the sensor data of the primary vehicle; (d) activating at least one action in the primary vehicle based upon the threat level for the primary vehicle; and/or (e) electronically transmitting the threat level of the primary vehicle to one or more additional vehicles. The method may include additional, less, or alternate actions, including those discussed elsewhere herein.

In a further aspect, a non-transitory computer-readable storage medium having computer-executable instructions embodied thereon may be provided. The computer-executable instructions may be implemented using one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, when executed by a processor coupled to at least memory device, the computer-executable instructions may cause the processor to: (a) receive sensor data associated with a primary vehicle; (b) determine a current condition of a driver of the primary vehicle based upon the sensor data of the primary vehicle; (c) determine a threat level for the primary vehicle based upon the current condition of the driver of the primary vehicle and the sensor data of the primary vehicle; (d) activate at least one action in the primary vehicle based upon the threat level for the primary vehicle; and/or (e) electronically transmit the threat level of the primary vehicle to one or more additional vehicles. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
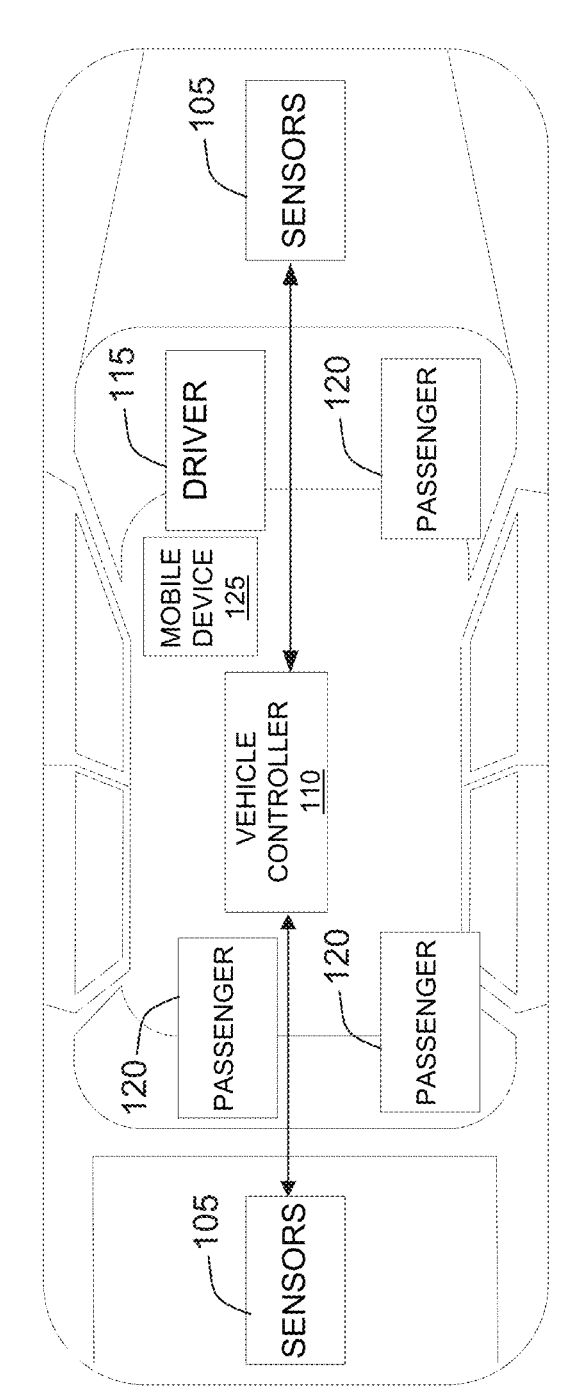
FIG. 1 illustrates a schematic diagram of an exemplary vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for detecting distracted driving and, after detecting the distracted driving, one or more of alerting the driver in question and nearby drivers and/or auto-correcting the vehicle of the distracted driver or the vehicles of the nearby drivers. In one exemplary embodiment, the process is performed by a distracted driving monitoring ("DDM") computer device, also known as a distracted driving monitoring ("DDM") server or DDM controller. The DDM server may be remote from the vehicle and cloud-based or the DDM server (or DDM controller) may be located at the vehicle. The DDM server provides in car feedback and automation about the other drivers on the road that are in a "distracted" mode while driving. In some embodiments, the DDM server may adjust various Advance Driving Assistance Systems (ADAS) based upon identified "threat" level to drive more defensively when "distracted" drivers are present around a car's driving area.

The DDM server includes a monitoring input (in car cameras, sensors, mobile apps) to determine if a driver is distracted. The DDM server communicates that information to the driver in the car and other drivers on the road within a close proximity. The DDM server may provide adjustments to the Advance Driving Assistance Systems (ADAS) to compensate for the driver who is distracted by adjusting speed, distance, appropriate lane, and route planning accordingly to enhance the degree of safety and reduce the potential of a collision. Drivers (including the distracted one) will be informed of the threat level of distraction and the action being taken by the engaged ADAS. In at least one embodiment, this communication uses Vehicle to Vehicle technology.

In at least one embodiment, data taken from the monitoring inputs may be sent out to the cloud and redistributed to all drivers in proximity of the distracted driving threat identified by their respective GPS locations provided by in car monitoring solutions or the various connected car solutions. Each of the monitoring solutions may send the distracted driving data to the cloud. AI (artificial intelligence) tools included in or accessible by the DDM server may evaluate and rate the distracted driving threat level. The distracted driving threat level may result in the appropriate safe action for all cars to perform that have the potential of negative impact coming from the distracted driver(s). Depending on the threat level, the impacted vehicles will either automatically respond and adjust, or the driver will be given the chance to intervene.

In the exemplary embodiment, sensor data may be continuously collected from a plurality of sources, that may include, but are not limited to, internal sensors, external sensors, and from at least one sensor associated with the mobile computer device. In some embodiments, the sensor data may be provided by a plurality of sensors in the vehicle. These may include sensors that detect conditions of vehicle, such as speed, acceleration, gear, braking, and other conditions related to the operation of vehicle, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. In some embodiments, the plurality of sensors may detect the presence of driver and one or more passengers in vehicle. In these embodiments, plurality of sensors may detect the presence of fastened seatbelts, the weight in each seat in vehicle, heat signatures, or any other method of detecting information about driver and passengers in vehicle. Furthermore, cameras/sensors may detect facial features of the driver to determine where the driver is looking and determine the current condition of the driver (tired, alert, distracted, etc.).

In some embodiments, a vehicle controller in the vehicle collects the sensor data from sensors and transmits the sensor data to the DDM server. In other embodiments, the user's mobile device transmits its collected sensor data to the DDM server. In still other embodiments, the user's mobile device is in communication with the vehicle controller. In these other embodiments, the user's mobile device transmits its collected sensor data to the vehicle controller and the vehicle controller transmits the sensor data from the user's mobile device and from the vehicle's sensors to the DDM server. In some cases, the vehicle controller may include or be in communication with the DDM server.

The DDM server analyzes the sensor data to determine a current condition of the driver. The current condition of the driver may be based upon sensor data including, but not limited to, driver's facial features, the direction of focus of the driver's eyes, detection and location of the driver's hands, the detection and/or identification of any objects in the hands of the driver, the current driving behavior of the driver, and/or an analysis of any changes to the driving behavior of the driver over a previous period of time. Based upon the current condition of the driver and their surrounding environment, the DDM server determines a current threat level from the current condition of the driver.

The current threat level identifies a current possibility of accident caused by the driver based upon their current condition and surrounding environment. For example, a driver that has looked away from the road to change the radio station may be a medium threat level especially if they are driving on a road with moderate traffic surrounding them, while a driver that is drinking a beverage while looking at the road with few vehicles on the road may be a low to medium threat level.

The DDM server may adjust the threat level based upon the current traffic conditions. For example, if the driver is stopped at a light while taking a drink, the DDM server may lower or remove the threat level. If the driver is traveling at 65 miles an hour on the highway, the DDM server may raise the threat level. If there are several vehicles surrounding the driver's vehicle on the highway, the DDM server may further raise the threat level.

Based upon the calculated threat level, the DDM server may determine which action to take to notify the driver to pay attention to the road. These actions may include, but are not limited to, an audio notification (either a tone or a verbal message), vibrating the steering, vibrating the driver's seat, vibrating one or more pedals, a visual notification on the dashboard, a visual notification on the infotainment panel, and/or a visual notification on a head's up display. The notification is configured to not startle the driver and to prevent causing the driver to lose control of the vehicle.

In at least one embodiment, the DDM server waits a period of time (e.g., 5 seconds) before notifying the driver to pay attention. This delay would be to allow the driver to correct themselves. This delay may be automatically adjustable based upon the current condition of the driver and/or the traffic around the driver. For example, a driver that takes a drink of a beverage and then puts the beverage back in the cupholder may not be notified if the action completes in the predetermined period of time. The delay period of time may be longer if the vehicle is on a straight road with no cars around. The delay period of time may be shorter if the driver is driving at a high rate of speed with other cars in the nearby lanes.

The DDM server may activate one or more autonomous and/or semi-autonomous actions to respond to the distracted driver condition and/or threat level. Examples of autonomous and/or semi-autonomous actions may include, but are not limited to, automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance.

The DDM server may also notify nearby vehicles of the determined threat level of the driver of the primary vehicle. The DDM server may only notify other vehicles based upon the current threat level exceed a predetermined threshold or a predetermined period of time. The DDM server makes the determination of whether or not to notify other vehicles based upon the likelihood that the primary vehicle may cause an accident and/or a distraction to other drivers. The DDM server may notify the other drivers by transmitting messages to other vehicles that are determined to be near the primary vehicle, such as through GPS (Global Positioning System) positioning. In some embodiments, the DDM server may determine nearby vehicles through vehicle-to-vehicle (V2V) wireless communication. In some of these embodiments, the DDM server may transmit the warning to the primary vehicle to communicate with the nearby vehicles through their V2V communication.

In at least one embodiment, the vehicle controllers of the nearby vehicles receive the warning messages and alert the drivers of those vehicles to the potential issue with driver distractedness. These warning messages may include, but are not limited to, an audio notification (either a tone or a verbal message), vibrating the steering, vibrating the driver's seat, vibrating one or more pedals, a visual notification on the dashboard, a visual notification on the infotainment panel, and/or a visual notification on a head's up display. These notifications may indicate the direction of the potentially distracted driver. These notifications may also indicate which vehicle has the driver that is potentially distracted. In some further embodiments, the vehicle controller may identify the vehicle of the distracted driver using augmented reality on the windshield in a heads up display to highlight or otherwise indicate the vehicle, such as with one or more arrows. In some embodiments, the DDM server may indicate to the other vehicles when the distracted condition is over, such as when the driver is paying alert attention to operating their vehicle.

In at least one embodiment, the DDM server may transmit notifications to vehicles within a specific distance from the primary vehicle. In some embodiments, the specific distance changes based upon the current traffic conditions. For example, the distance may be greater at higher speeds. In some of these embodiments, the DDM server determines the distance based upon the amount of time for the vehicle to reach a similar point. In some additional embodiments, the distance may be greater behind the primary vehicle and less in front of the vehicle. The DDM server may also transmit notifications to vehicles in oncoming lanes. For example, on a road with one lane each for two-way traffic, the DDM server may transmit distracted driver warnings to on-coming vehicles. While on a divided highway, the DDM server might not transmit distracted driver warnings to oncoming traffic.

At least one of the technical problems addressed by this system may include: (i) improving safety on the roads; (ii) improved notification of potentially dangerous conditions while operating a vehicle; (iii) improved speed and efficiency of processing distracted driver notifications; (iv) reduced chance of vehicular accidents; and/or (iv) wider net of notifications of distracted driving conditions occurring.

The methods and systems described herein may be implemented using computer programming or engineering techniques including computer software, firmware, hardware, or any combination or subset thereof, wherein the technical effects may be achieved by performing at least one of the following steps: a) receive sensor data associated with a primary vehicle; b) determine a current condition of a driver of the primary vehicle based upon the sensor data of the primary vehicle; c) determine a threat level for the primary vehicle based upon the current condition of the driver of the primary vehicle and the sensor data of the primary vehicle; d) activate at least one action in the primary vehicle based upon the threat level for the primary vehicle; e) electronically transmit the threat level of the primary vehicle to one or more additional vehicles; f) wherein the one or more additional vehicles are configured to activate at least one alert action to notify a driver of the corresponding vehicle of the threat level of the primary vehicle; g) wherein the at least one action includes activating at least one autonomous and/or semi-autonomous system in the primary vehicle; h) wherein the at least one action includes notifying the driver of the primary vehicle to pay attention to the operation of the primary vehicle; i) wherein the computer system is a vehicle controller of the primary vehicle; j) wherein the computer system is a cloud-based system in communication with the primary vehicle; k) wherein the computer system transmits the threat level of the primary vehicle to the one or more additional vehicles via vehicle to vehicle (V2V) wireless communications; l) transmit at least a portion of the sensor data to the one or more additional vehicles; m) transmit an updated threat level to the one or more additional vehicles; n) wherein the sensor data includes internal data from inside the primary vehicle; o) wherein the sensor data includes external data from outside of the primary vehicle; p) determine the one or more additional vehicles within a predetermined distance of the primary vehicle; and/or q) determine the predetermined distance of the primary vehicle based upon the speed of the primary vehicle.

Exemplary Vehicle

FIG. 1 depicts a view of an exemplary vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 is a manual vehicle, such as a traditional automobile that is controlled by a driver 115.

Vehicle 100 may include a plurality of sensors 105 and a vehicle controller 110. The plurality of sensors 105 may detect the current surroundings and location of vehicle 100. Plurality of sensors 105 may include, but are not limited to, radar, LIDAR, Global Positioning System (GPS), video devices, imaging devices, cameras, audio recorders, and computer vision. Plurality of sensors 105 may also include sensors that detect conditions of vehicle 100, such as speed, acceleration, gear, braking, and other conditions related to the operation of vehicle 100, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, plurality of sensors 105 may include impact sensors that detect impacts to vehicle 100, including force and direction and sensors that detect actions of vehicle 100, such the deployment of airbags. In some embodiments, plurality of sensors 105 may detect the presence of driver 115 and one or more passengers 120 in vehicle 100. In these embodiments, plurality of sensors 105 may detect the presence of fastened seatbelts, the weight in each seat in vehicle 100, heat signatures, or any other method of detecting information about driver 115 and passengers 120 in vehicle 100.

In some embodiments, plurality of sensors 105 may include sensors for determining weight distribution information of vehicle 100. Weight distribution information may include, but is not limited to, the weight and location of remaining gas, luggage, occupants, and/or other components of vehicle 100. In some embodiments, plurality of sensors 105 may include sensors for determining remaining gas, luggage weight, occupant body weight, and/or other weight distribution information. In certain embodiments, plurality of sensors 105 may include occupant position sensors to determine a location and/or position of each occupant (e.g., driver 115 and passengers 120) in vehicle 100. The location of an occupant may identify a particular seat or other location within vehicle 100 where the occupant is located. The position of the occupant may include the occupant's body orientation, the location of specific limbs, and/or other positional information.

In one example, plurality of sensors 105 may include an in-cabin facing camera, LIDAR, radar, weight sensors, accelerometer, gyroscope, compass and/or other types of sensors to identify the location and/or position of occupants within vehicle 100. Vehicle controller 110 and/or another computing device(s) (e.g., mobile device(s)) may be configured to monitor sensor data from plurality of sensors 105 and/or other sensors to determine weight distribution information and/or location and position of the occupants. In one example, vehicle controller 110 may compare sensor data for a particular event (e.g., a road bump) with historical sensor data to identify the weight distribution of vehicle 100 and/or the location of the occupants of vehicle 100. In another example, plurality of sensors 105 may include weight sensors that vehicle controller 110 monitors to determine the weight distribution information.

Vehicle controller 110 may interpret the sensory information to identify appropriate navigation paths, detect threats, and react to conditions. In some embodiments, vehicle controller 110 may be able to communicate with one or more remote computer devices, such as mobile device 125. In the exemplary embodiment, mobile device 125 is associated with driver 115 and includes one or more internal sensors, such as an accelerometer, a gyroscope, and/or a compass. Mobile device 125 may be capable of communicating with vehicle controller 110 wirelessly. In addition, vehicle controller 110 and mobile device may be configured to communicate with computer devices located remotely from vehicle 100. Furthermore, cameras/sensors 105 may detect facial features of the driver 115 to determine where the driver 115 is looking and determine the current condition of the driver 115 (tired, alert, distracted, etc.).

In some embodiments, vehicle 100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or backup systems; navigation or GPS-related systems; security and/or anti-hacking measures; and/or theft prevention systems.

While vehicle 100 may be an automobile in the exemplary embodiment, in other embodiments, vehicle 100 may be, but is not limited to, other types of ground craft, aircraft, and watercraft vehicles.

Exemplary Driving Scenario

Figure 2:
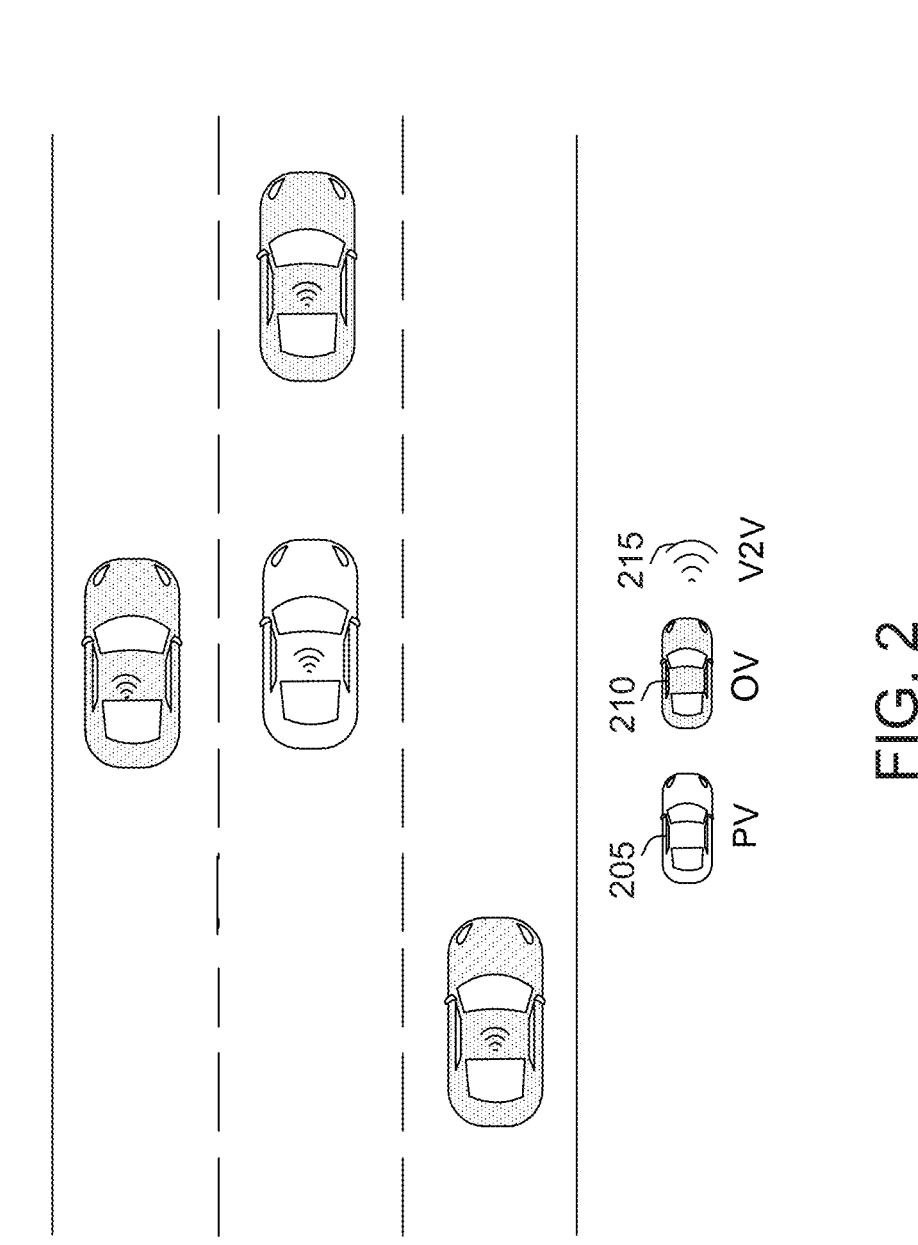
FIG. 2 illustrates a block diagram of an exemplary driving scenario for the vehicle shown in FIG. 1.

FIG. 2 illustrates a block diagram of a driving scenario 200 for the vehicle shown in FIG. 1. Scenario 200 includes a primary vehicle (PV) 205 in its current lane and other vehicles (OV) 210 in the same lane and/or in nearby lanes. In some embodiments, the PV 205 and OVs 210 may be in communication using V2V communication 215. In some other embodiments, the PV 205 and OV 210 are in communication with DDM server 410 (shown in FIG. 4).

Exemplary Computer-Implemented Method for Monitoring Distracted Driving

Figure 3:
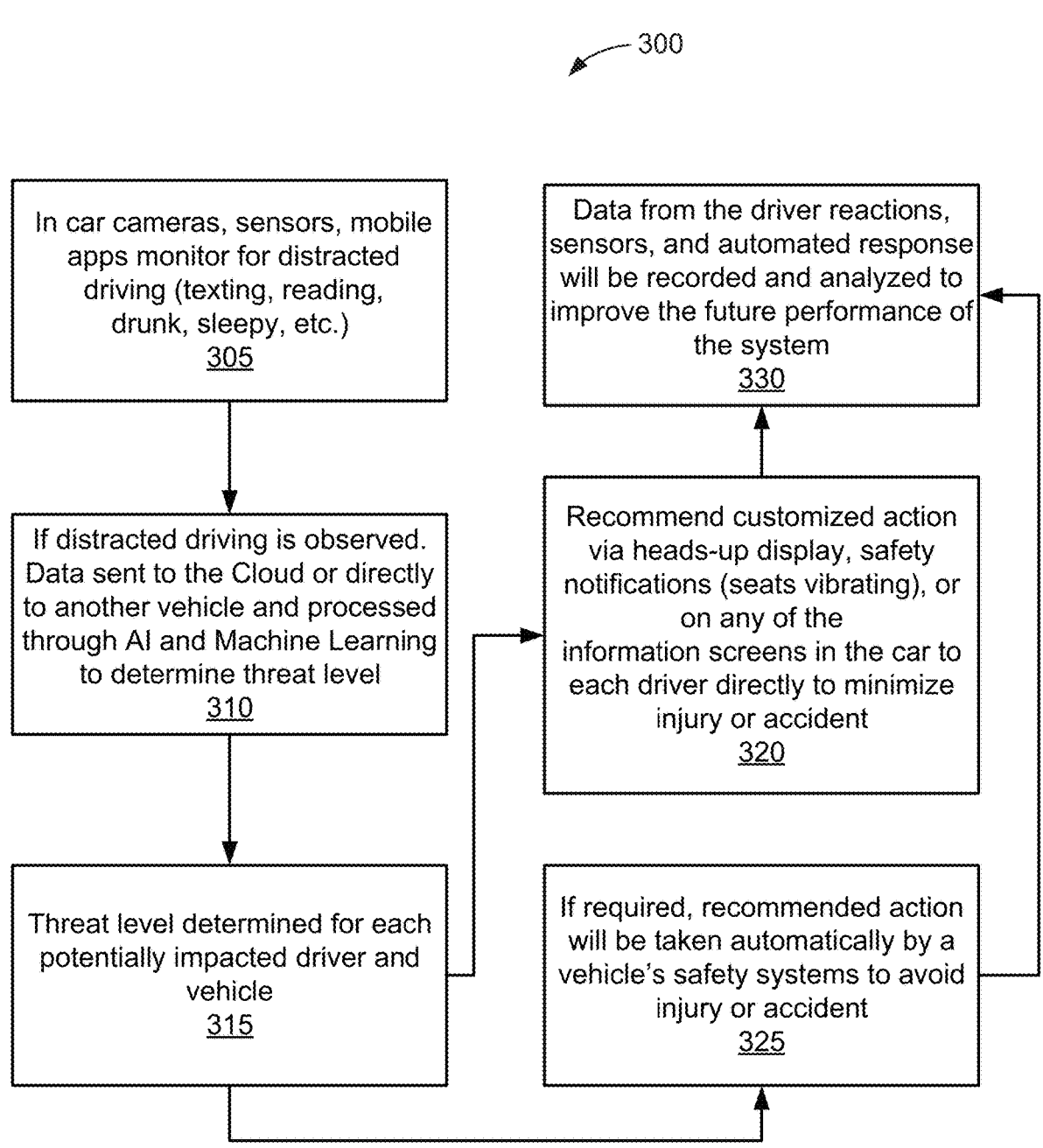
FIG. 3 illustrates a flow chart of an exemplary computer implemented process for monitoring distracted driving for the vehicle shown in FIG. 1 and the scenario shown in FIG. 2.

FIG. 3 illustrates a flow chart of an exemplary computer implemented process 300 for monitoring distracted driving for the vehicle 100 (shown in FIG. 1) and the scenario 200 (shown in FIG. 2). Process 300 may be implemented by a computing device, for example DDM server 410 (shown in FIG. 4). In the exemplary embodiment, DDM server 410 may be in communication with a mobile computer device 405 (shown in FIG. 4), such as mobile device 125 or vehicle controller 110 (both shown in FIG. 1).

In the exemplary embodiment, in car cameras, sensors, and/or mobile apps monitor 305 for distracted driving (texting, reading, drunk, sleepy, etc.) on the part of the driver 115 (shown in FIG. 1) of the primary vehicle 205 (shown in FIG. 2). The in-car cameras and sensors may include sensors 105 (shown in FIG. 1). In some embodiments, the DDM server 410 also analyzes external sensors 105. In the exemplary embodiment, sensor data may be continuously collected from a plurality of sources, that may include, but are not limited to, internal sensors, external sensors, and from at least one sensor associated with the mobile computer device 125 (shown in FIG. 1). In some embodiments, the sensor data may be provided by a plurality of sensors 105 in the primary vehicle 205. These may include sensors 105 that detect conditions of primary vehicle 205, such as speed, acceleration, gear, braking, and other conditions related to the operation of primary vehicle 205, for example: at least one of a measurement of at least one of speed, direction rate of acceleration, rate of deceleration, location, position, orientation, and rotation of the vehicle, 100 and a measurement of one or more changes to at least one of speed, direction rate of acceleration, rate of deceleration, location, position, orientation, and rotation of the vehicle 100. In some embodiments, the plurality of sensors may detect the presence of driver 115 and one or more passengers 120 in vehicle 100. In these embodiments, plurality of sensors may detect the presence of fastened seatbelts, the weight in each seat in vehicle 100, heat signatures, or any other method of detecting information about driver 115 and passengers 120 in the vehicle 100. Furthermore, cameras/sensors 105 may detect facial features of the driver 115 to determine where the driver 115 is looking and determine the current condition of the driver 115 (tired, alert, distracted, etc.).

If the vehicle controller 110 observes distracted driving, the vehicle controller 110 may transmit 310 the data to the DDM server 410. In some embodiments, the vehicle controller 110 transmits 310 the data to another vehicle, such as OV 210 (shown in FIG. 2). In some embodiments, a vehicle controller 110 in the vehicle collects the sensor data from sensors 105 and transmits 310 the sensor data to the DDM server 410. In other embodiments, the user's mobile device 125 transmits its collected sensor data to the DDM server 410. In still other embodiments, the user's mobile device 125 is in communication with the vehicle controller 110. In these other embodiments, the user's mobile device 125 transmits its collected sensor data to the vehicle controller 11 and the vehicle controller 11 transmits the sensor data from the user's mobile device 125 and from the vehicle's sensors 105 to the DDM server 410.

In the exemplary embodiment, at least one of the DDM server 410 and/or the vehicle controller 110 of the corresponding OV 210 determine 315 the threat level for each potentially impacted driver 115 and other vehicle 210. In at least one embodiment, the DDM server 410 processes the data through artificial intelligence (AI) and/or machine learning (ML) to determine 315 the threat level.

The DDM server 410 may analyzes the sensor data to determine a current condition of the driver 115 and their surrounding environment. The current condition of the driver 115 and their surrounding environment may be based upon sensor data including, but not limited to, driver's facial features, the direction of focus of the driver's eyes, detection and location of the driver's hands, the detection and/or identification of any objects in the hands of the driver, the current driving behavior of the driver, and/or an analysis of any changes to the driving behavior of the driver over a previous period of time. Based upon the current condition of the driver and their surrounding environment, the DDM server 410 determines 315 a current threat level from the current condition of the driver 115 and their surrounding environment.

The current threat level identifies a current possibility of accident caused by the driver 115 based upon their current condition. For example, a driver 115 that has looked away from the road to change the radio station may be a medium threat level, while a driver 115 that is drinking a beverage while looking at the road may be a low to medium threat level.

The DDM server 410 may adjust the threat level based upon the current traffic conditions. For example, if the driver 115 is stopped at a light while taking a drink, the DDM server 410 may lower or remove the threat level. If the driver 115 is traveling at 65 miles an hour on the highway, the DDM server 410 may raise the threat level. If there are several vehicles surrounding the driver's vehicle 205 on the highway, the DDM server 410 may further raise the threat level.

In the exemplary embodiment, the DDM server 410 and/or the vehicle controller 110 activates 320 a customized action, such as via heads-up display, safety notifications (seats vibrating), or on any of the information screens in the vehicle 100 to each driver 115 directly to minimize injury or accident. Based upon the calculated threat level, the DDM server 410 may determine which action to take to notify the driver 115 to pay attention to the road. These actions may include, but are not limited to, an audio notification (either a tone or a verbal message), vibrating the steering, vibrating the driver's seat, vibrating one or more pedals, a visual notification on the dashboard, a visual notification on the infotainment panel, and/or a visual notification on a head's up display. The notification is configured to not startle the driver 115 and to prevent causing the driver 115 to lose control of the primary vehicle 205. In one example embodiment, the DDM server 410 may sound a noise, such as a horn, to attract the attention of the occupant and entice the occupant to change their direction of facing, such as towards the sounds.

In at least one embodiment, the DDM server 410 waits a period of time (i.e., 5 seconds) before notifying the driver 115 to pay attention. This delay would be to allow the driver 115 to correct themselves. This delay may be automatically adjustable based upon the current condition of the driver 115 and/or the traffic around the driver 115. For example, a driver 115 that takes a drink of a beverage and then puts the beverage back in the cupholder may not be notified if the action completes in the predetermined period of time (e.g., less than five seconds). The delay period of time may be longer if the primary vehicle 205 is on a straight road with no other vehicles 210 around. The delay period of time may be shorter if the driver 115 is driving at a high rate of speed with other vehicles 210 in the nearby lanes.

The DDM server 410 may also notify nearby vehicles 210 of the determined threat level of the driver 115 of the primary vehicle 205. The DDM server 410 may only notify other vehicles 210 based upon the current threat level exceed a predetermined threshold or a predetermined time period. The DDM server 410 makes the determination of whether or not to notify other vehicles 210 based upon the likelihood that the primary vehicle 205 may cause an accident and/or a distraction to other drivers 115. The DDM server 410 may notify the other drivers 115 by transmitting messages to other vehicles 210 that are determined to be near the primary vehicle 205, such as through GPS (Global Positioning System) positioning. In some embodiments, the DDM server 410 may determine nearby vehicles through vehicle-to-vehicle (V2V) wireless communication 215. In some of these embodiments, the DDM server 410 may transmit the warning to the primary vehicle 205 to communicate with the nearby vehicles 210 through their V2V communication 215.

In at least one embodiment, the vehicle controllers 110 of the nearby vehicles 210 receive the warning messages and alert the drivers 115 of those vehicles 210 to the potential issue with driver distractedness. These warning messages may include, but are not limited to, an audio notification (either a tone or a verbal message), vibrating the steering, vibrating the driver's seat, vibrating one or more pedals, a visual notification on the dashboard, a visual notification on the infotainment panel, and/or a visual notification on a head's up display. These notifications may indicate the direction of the potentially distracted driver 115. These notifications may also indicate which vehicle has the driver that is potentially distracted. In some further embodiments, the vehicle controller 110 may identify the vehicle 205 of the distracted driver 115 using augmented reality to highlight or otherwise indicate the vehicle 205. In some embodiments, the DDM server 410 may indicate to the other vehicles 210 when the distracted condition is over, such as when the driver 115 is paying alert attention to operating the vehicle 205.

In at least one embodiment, the DDM server 410 may transmit notifications to vehicles 210 within a specific distance from the primary vehicle 205. In some embodiments, the specific distance changes based upon the current traffic conditions. For example, the distance may be greater at higher speeds. In some of these embodiments, the DDM server 410 determines the distance based upon the amount of time for the other vehicle 210 to reach a similar point. In some additional embodiments, the distance may be greater for vehicles 210 behind the primary vehicle 205 and less for vehicles 210 in front of the primary vehicle 205. The DDM server 410 may also transmit notifications to vehicles 210 in oncoming lanes. For example, on a road with one lane each for two-way traffic, the DDM server 410 may transmit distracted driver warnings to on-coming vehicles. While on a divided highway, the DDM server 410 might not transmit distracted driver warnings to oncoming traffic.

If required, the DDM server 410 may instruct the vehicle controller 110 to take one or more recommended actions 325 may be taken automatically, such as by a vehicle's safety systems to avoid injury or accident. The DDM server 410 and/or the vehicle controller 110 may activate 325 one or more autonomous and/or semi-autonomous actions to respond to the distracted driver condition and/or threat level. Examples of autonomous and/or semi-autonomous actions may include, but are not limited to automatic or semi-automatic steering; automatic or semi-automatic accelera-tion and/or braking; automatic or semi-automatic blind spot monitoring; automatic or semi-automatic collision warning; adaptive cruise control; and/or automatic or semi-automatic parking assistance.

In the exemplary embodiment, the DDM server collects 330 data from the driver reactions, sensors, and automated response to be recorded and analyzed to improve the future performance of the system.

Exemplary Computer Network

Figure 4:
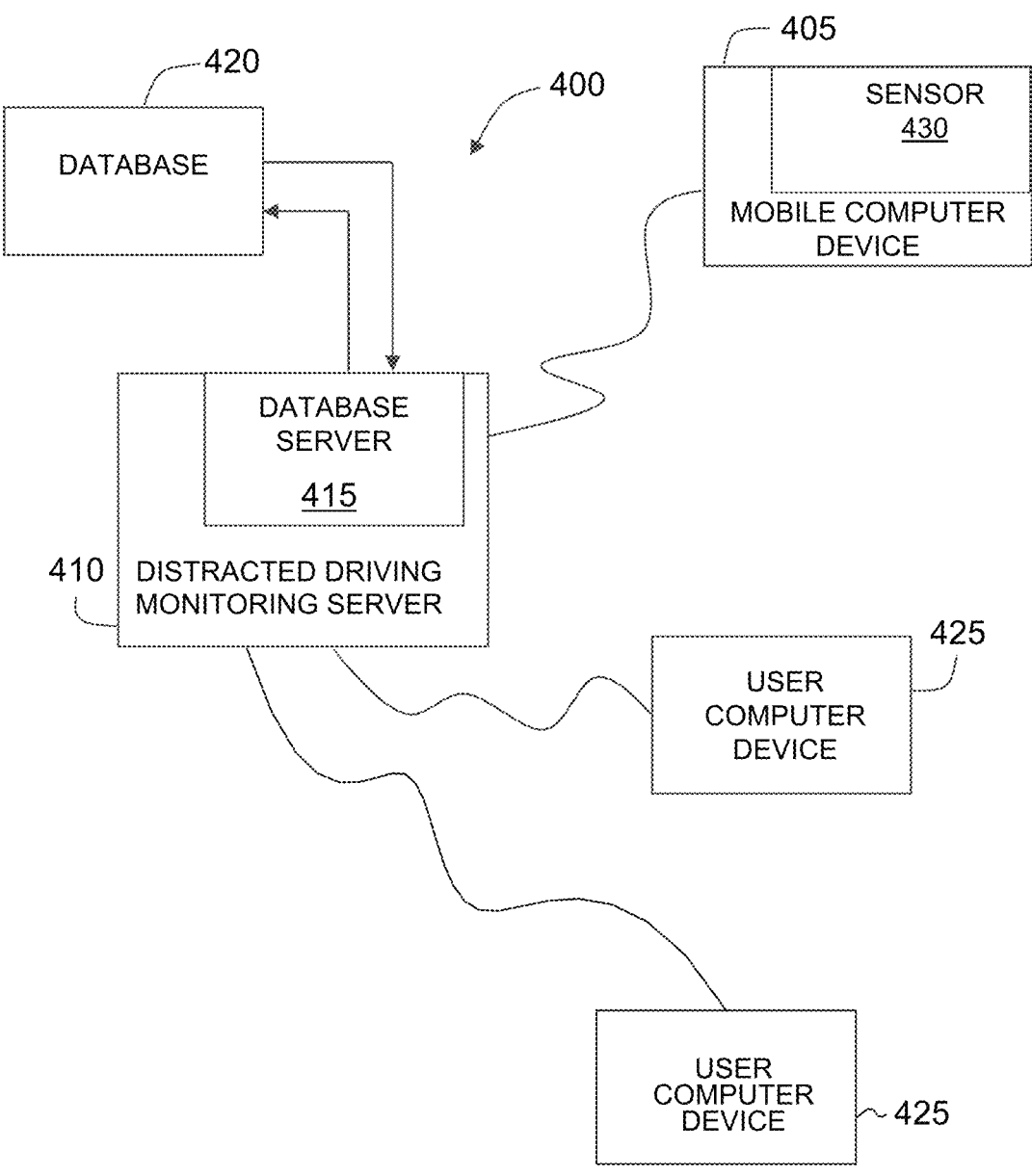
FIG. 4 illustrates a simplified block diagram of an exemplary computer system for implementing the process shown in FIG. 1.

FIG. 4 depicts a simplified block diagram of an exemplary computer system 400 for implementing process 300 shown in FIG. 3. In the exemplary embodiment, system 400 may be used for monitoring for distracted driving based upon sensor data, alerting the driver in question to their distracted behavior, and notifying other drivers in nearby vehicles. As described below in more detail, distracted driving monitor-ing ("DDM") server 410 may be configured to (1) receive sensor data associated with a primary vehicle 205 (shown in FIG. 2); (2) determine a current condition of a driver 115 (shown in FIG. 1) of the primary vehicle 205 based upon the sensor data of the primary vehicle 205; (3) determine a threat level for the primary vehicle 205 based upon the current condition of the driver 115 of the primary vehicle 205 and the sensor data of the primary vehicle 205; (4) activate at least one action in the primary vehicle 205 based upon the threat level for the primary vehicle 205; and/or (5) elec-tronically transmit the threat level of the primary vehicle 205 to one or more additional vehicles 210 (shown in FIG. 2).

In the exemplary embodiment, user computer devices 425 are computers that include a web browser or a software application, which enables user computer devices 425 to access DDM server 410 using the Internet or other network. More specifically, user computer devices 425 are commu-nicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 425 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based con-nectable equipment or mobile devices. The DDM server 410 may be remote from the vehicle 100 and cloud-based or the DDM server 410 (or DDM controller) may be located at the vehicle 100. In some embodiments, user computer devices 425 are vehicle controllers 110 (shown in FIG. 1) of other vehicles 210 (shown in FIG. 2).

A database server 415 may be communicatively coupled to a database 420 that stores data. In one embodiment, database 420 may include vehicular crash scenarios, sensor data, and/or insurance claim forms. In the exemplary embodiment, database 420 may be stored remotely from DDM server 410. In some embodiments, database 420 may be decentralized. In the exemplary embodiment, a user may access database 420 via user computer devices 405 by logging onto DDM server 410, as described herein.

DDM server 410 may be communicatively coupled with the user computer devices 425. In some embodiments, DDM server 410 may be associated with, or is part of a computer network associated with a vehicle manufacturer or an insur-ance provider, or in communication with the vehicle manu-facturer's or the insurance provider's computer network (not shown). In other embodiments, DDM server 410 may be associated with a third party and is merely in communication with the vehicle manufacturer's or the insurance provider's computer network.

One or more mobile computer devices 405 may be communicatively coupled with DDM server 410 through the Internet or a cellular network. In the exemplary embodi-ment, mobile computer devices 405 are computers that include a software application, which enables mobile com-puter devices 405 to access DDM server 410 using the Internet or other network. More specifically, mobile com-puter devices 405 are communicatively coupled to the Internet through many interfaces including, but not limited to, at least one of a network, such as the Internet, a local area network (LAN), a wide area network (WAN), or an inte-grated services digital network (ISDN), a dial-up-connec-tion, a digital subscriber line (DSL), a cellular phone con-nection, and a cable modem.

Mobile computer devices 405 may also include one or more sensors 430. Mobile computer devices 405 may be configured to receive data from sensors 430 and transmit sensor data to DDM server 410. In some embodiments, mobile computer device 405 may be mobile device 125 associated with one of the occupants of vehicle 100. Mobile computer device 405 may be, but is not limited to, a personal digital assistant (PDA), a cellular phone, a smartphone, a tablet, a phablet, wearable electronics, smart watch, or other web-based connectable equipment or mobile devices that allow them to function as described herein. In other embodi-ments, mobile computer device 405 is vehicle 100, and more specifically, vehicle controller 110 (shown in FIG. 1). In some of these embodiments, vehicle controller 110 is in communication with a second mobile computer device 405, such as a user computer device 425. In these embodiments, vehicle controller 110 may be configured to receive sensor data from user computer device 425 and transmit the sensor data to DDM server 410. In some embodiments, mobile computer device 405 may include the vehicle controller 110 of the primary vehicle 205 (shown in FIG. 2).

In the exemplary embodiment, sensor 430 may be a configured to detect one or more conditions about vehicle 100, such as primary vehicle 205. For example, sensor 430 may be sensor 105 (shown in FIG. 1). In other embodiments, sensor 430 may be configured to detect one or more condi-tions of one or more occupants of vehicle 100, such as driver 115 and/or passengers 120 (both shown in FIG. 1).

Exemplary Client Device

Figure 5:
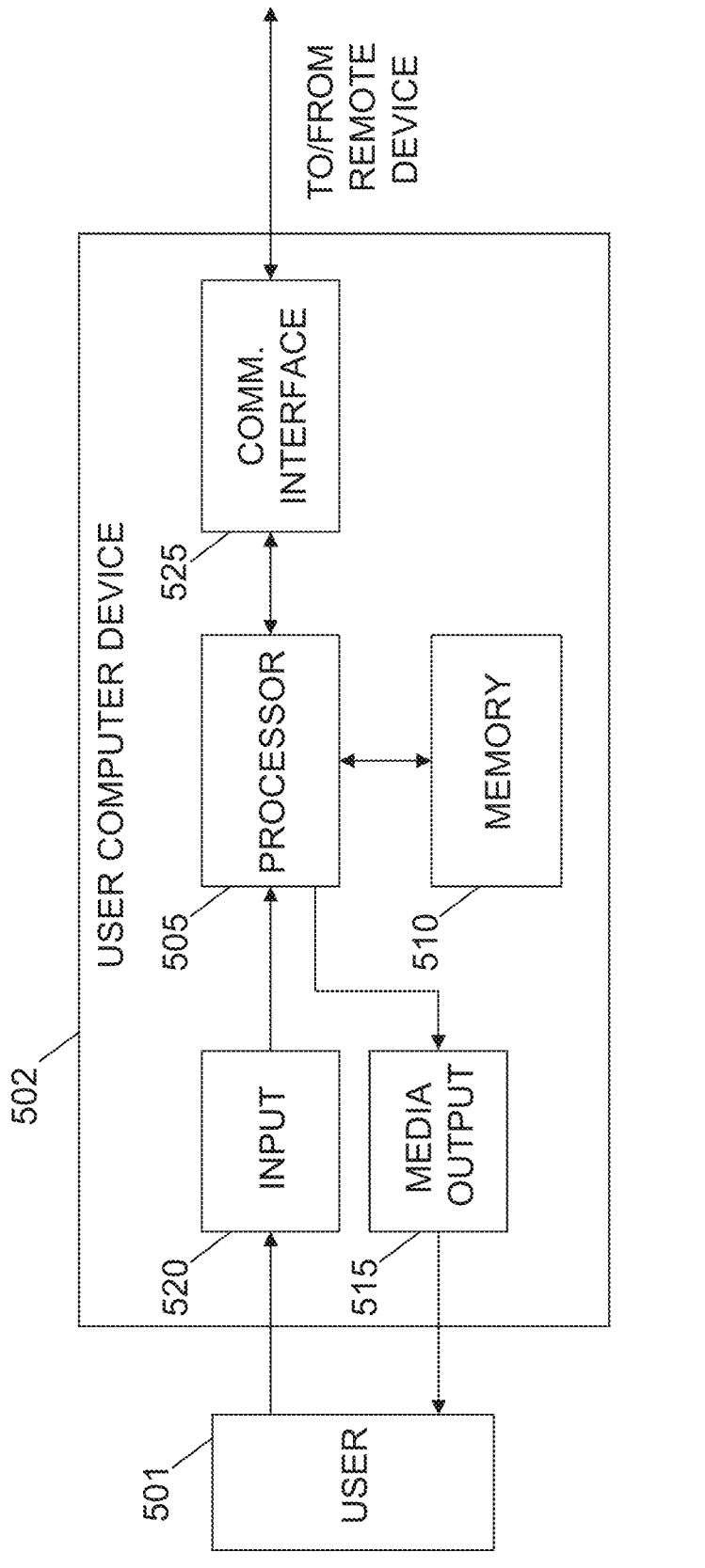
FIG. 5 illustrates an exemplary configuration of a client computer device shown in FIG. 4, in accordance with one embodiment of the present disclosure.

FIG. 5 depicts an exemplary configuration of user com-puter device 425 shown in FIG. 4, in accordance with one embodiment of the present disclosure. User computer device 502 may be operated by a user 501. User computer device 502 may include, but is not limited to, user computer devices 425 (shown in FIG. 4), mobile computer device 405 (shown in FIG. 4), vehicle controller 110 (shown in FIG. 1), and mobile device 125 (shown in FIG. 1). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an interface for determining issues with nearby vehicles. In some embodiments, user computer device 502 may include an input device 520 for receiving input from user 501. User 501 may use input device 520 to, without limitation, acknowledge the issue notification.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as DDM server 410 (shown in FIG. 4) or vehicle controller 110. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from DDM server 410. A client application allows user 501 to interact with, for example, DDM server 410. For example, instructions may be stored by a cloud service, and the output of the execution of the instructions sent to the media output component 515.

Figure 7:
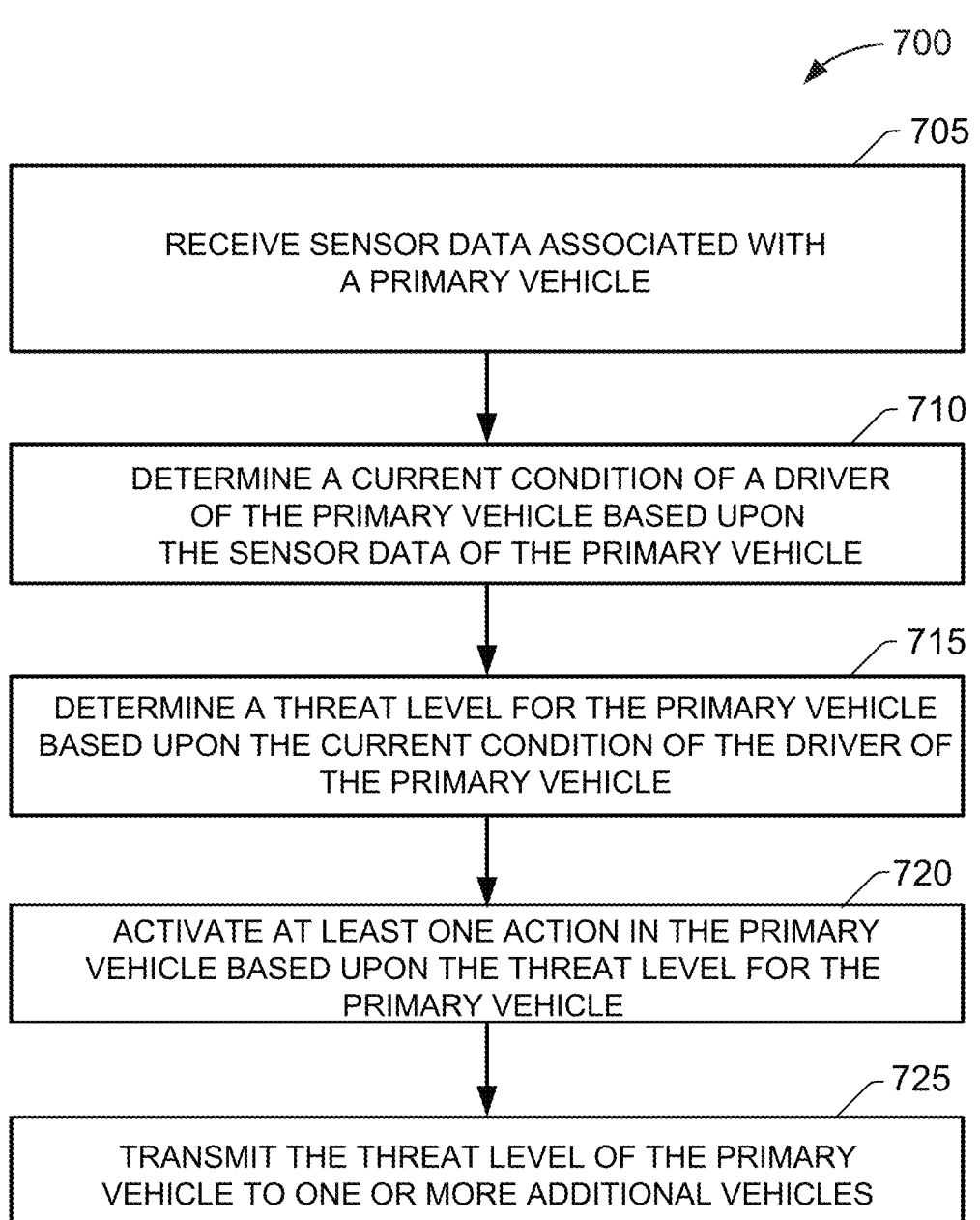
FIG. 7 illustrates a flow chart of an exemplary computer-implemented process of notifying emergency services of a vehicular crash using the system shown in FIG. 4.

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 may be programmed with the instruction such as illustrated in FIGS. 3 and 7.

In some embodiments, user computer device 502 may include, or be in communication with, one or more sensors, such as sensor 105 (shown in FIG. 1) and sensor 430 (shown in FIG. 4). User computer device 502 may be configured to receive data from the one or more sensors and store the received data in memory area 510. Furthermore, user computer device 502 may be configured to transmit the sensor data to a remote computer device, such as DDM server 410, through communication interface 525.

Exemplary Server Device

Figure 6:
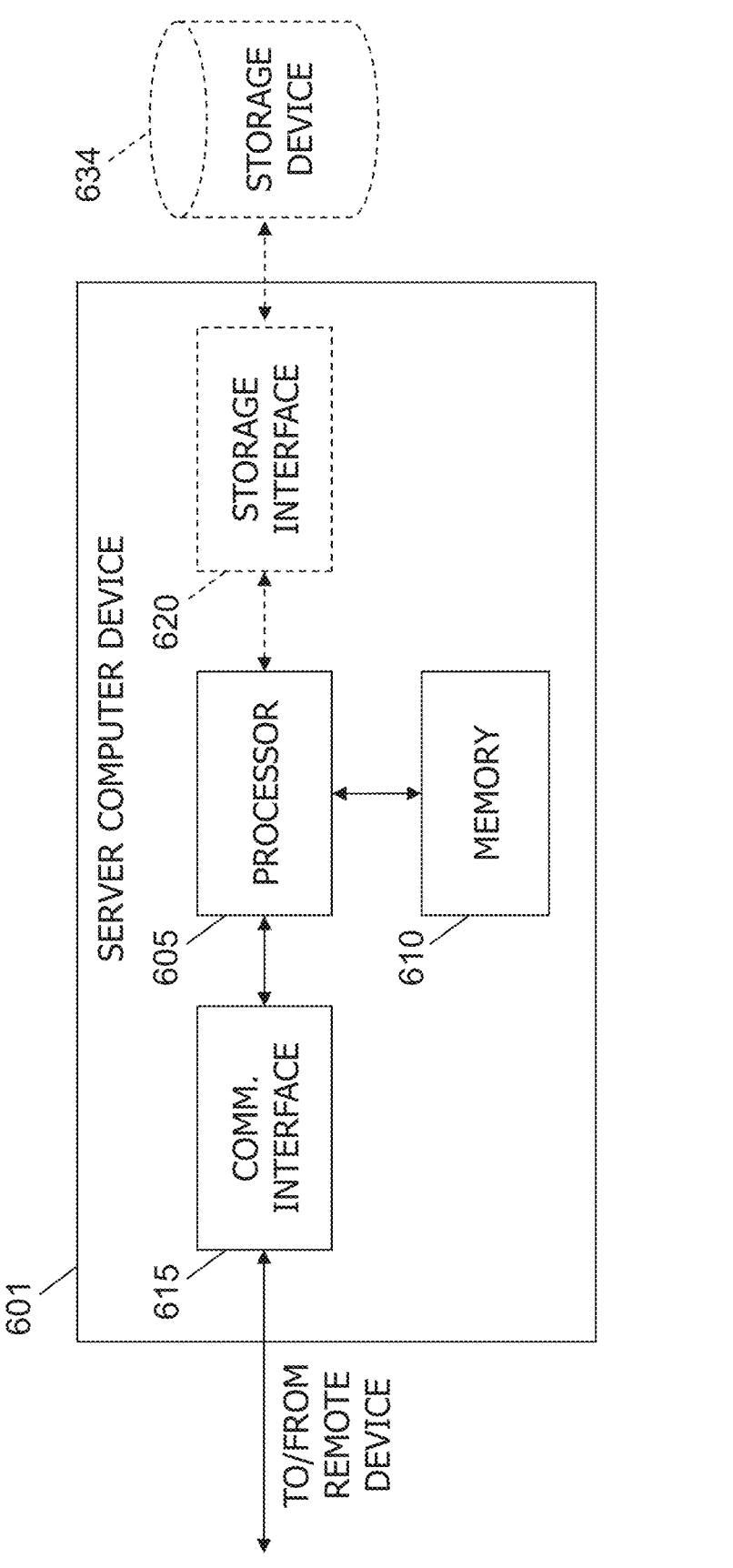
FIG. 6 illustrates an exemplary configuration of a server shown in FIG. 4, in accordance with one embodiment of the present disclosure.

FIG. 6 depicts an exemplary configuration of a server 410 (shown in FIG. 4), in accordance with one embodiment of the present disclosure. Server computer device 601 may include, but is not limited to, database server 415, DDM server 410 (both shown in FIG. 4), and vehicle controller 110 (shown in FIG. 1). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, mobile device 125 (shown in FIG. 1), mobile computer device 405 (shown in FIG. 4), user computer device 425 (shown in FIG. 4), and DDM server 410. For example, communication interface 615 may receive requests from user computer devices 425 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 3 and 7.

Exemplary Computer-Implemented Method for Monitoring, Alerting, and Correcting Distracted Driving FIG. 7 illustrates a flow chart of an exemplary computer implemented process 700 for monitoring distracted driving for the vehicle 100 (shown in FIG. 1) and using the system 400 shown in FIG. 4. Process 700 may be implemented by a computing device, for example DDM server 410 (shown in FIG. 4) and/or vehicle controller 110 (shown in FIG. 1).

In the exemplary embodiment, DDM server 410 may be in communication with a mobile computer device 405 (shown in FIG. 4), such as mobile device 125, and/or vehicle controller 110 (both shown in FIG. 1).

In the exemplary embodiment, the DDM server 410 may receive 705 sensor data associated with a primary vehicle 205 (shown in FIG. 2).

In the exemplary embodiment, the DDM server 410 may 710 determine a current condition of a driver 115 (shown in FIG. 1) of the primary vehicle 205 based upon the sensor data of the primary vehicle 205 and the sensor data of the primary vehicle 205.

In the exemplary embodiment, the DDM server 410 may determine 715 a threat level for the primary vehicle 205 based upon the current condition of the driver 115 of the primary vehicle 205 and their surrounding environment.

In the exemplary embodiment, the DDM server 410 may activate 720 at least one action in the primary vehicle 205 based upon the threat level for the primary vehicle 205.

In the exemplary embodiment, the DDM server 410 may electronically transmit 725 the threat level of the primary vehicle 205 to one or more additional vehicles 210 (shown in FIG. 2).

In some embodiments, the one or more additional vehicles 210 may be configured to activate at least one alert action to notify a driver 115 of the corresponding vehicle 210 of the threat level of the primary vehicle 205.

In some further embodiments, the at least one action may include activating at least one autonomous and/or semi-autonomous system in the primary vehicle 205.

In some additional embodiments, the at least one action may include notifying the driver 115 of the primary vehicle 205 to pay attention to the operation of the primary vehicle 205.

In yet further embodiments, the computer system may be a vehicle controller 110 (shown in FIG. 1) of the primary vehicle 205. In still further embodiments, the computer system may be a cloud-based system in communication with the primary vehicle 205.

In yet additional embodiments, the DDM server 410 may transmit 725 the threat level of the primary vehicle 205 to the one or more additional vehicles 210 via vehicle to vehicle (V2V) wireless communications 215 (shown in FIG. 2).

In still additional embodiments, the DDM server 410 may transmit at least a portion of the sensor data to the one or more additional vehicles 210. In further embodiments, the DDM server 410 may transmit an updated threat level to the one or more additional vehicles 210.

In still further embodiments, the sensor data may include internal data from inside the primary vehicle 205. In other embodiments, the sensor data includes external data from outside of the primary vehicle 205.

In additional embodiments, the DDM server 410 may determine that the one or more additional vehicles 210 are positioned within a predetermined distance of the primary vehicle 205. The DDM server 410 may determine the predetermined distance of the primary vehicle 205 relative to the other vehicles based upon the speed of the primary vehicle 205.

Exemplary Autonomous Feature Selection & Engagement

The one or more processors, sensors, and/or transceivers may be configured or programmed to select an autonomous or semi-autonomous vehicle feature or system to engage based upon (i) the occupant data, (ii) the external data, and/or (iii) the positional information. Additionally or alternatively, the system may be configured to select an autonomous or semi-autonomous vehicle feature or system to engage based upon (1) vehicle weight distribution; and/or (2) occupant skeletal positioning prior to the vehicle collision (as determine from analysis of vehicle-mounted and/or mobile device sensor data, and discussed with respect to FIG. 11). The system may include additional, less, or alternate functionality, including that discussed elsewhere herein.

In another aspect, a computer-based method for detecting a vehicular crash and/or selecting an autonomous or semi-autonomous vehicle feature to engage may be provided. The method may be implemented on a vehicle computer device including one or more processors, sensors, and/or transceivers in communication with at least one memory device. The method may include, via the one or more processors, sensors, and/or transceivers: (1) receiving occupant data from at least one internal sensor; (2) receiving external data from the at least one external sensor; (3) determining, by the vehicle computer device, that a potential vehicular crash is imminent based upon the received external data; and/or (4) automatically engaging an autonomous or semi-autonomous vehicle feature or system to avoid the vehicle collision or otherwise mitigate damage caused by the vehicle collision. The method may further include determining, via the one or more processors, sensors, and/or transceivers, positional information for at least one occupant of a vehicle based upon the occupant data.

The method may include selecting, via the one or more processors, sensors, and/or transceivers, an autonomous or semi-autonomous vehicle feature or system to engage based upon (i) the occupant data, (ii) the external data, (iii) the positional information, and/or other sensor data. For instance, an amount of deceleration or force to apply to the brakes may be determined based upon the (i) occupant data, (ii) external data, and/or (iii) positional information. Additionally or alternatively, the method may include selecting, via the one or more processors, sensors, and/or transceivers, an autonomous or semi-autonomous vehicle feature or system to engage based upon (1) vehicle weight distribution; and/or (2) occupant skeletal positioning prior to the vehicle collision (as determine from analysis of vehicle-mounted and/or mobile device sensor data). The method may include additional, less, or alternate actions, including those discussed elsewhere herein.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

For the method discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

Exemplary Embodiments & Functionality

In one aspect, a computer system for monitoring distracted driving may be provided. The computer system may include at least one processor in communication with at least one memory device. The at least one processor may be configured or programmed to: (1) receive sensor data associated with a primary vehicle; (2) determine a current condition of a driver of the primary vehicle based upon the sensor data of the primary vehicle; (3) determine a threat level for the primary vehicle based upon the current condition of the driver of the primary vehicle and the sensor data of the primary vehicle; (4) activate at least one action in the primary vehicle based upon the threat level for the primary vehicle; and/or (5) electronically transmit the threat level of the primary vehicle to one or more additional vehicles. The computer system may have additional, less, or alternate functionality, including that discussed elsewhere herein.

A further enhancement may be where the one or more additional vehicles are configured to activate at least one alert action to notify a driver of the corresponding vehicle of the threat level of the primary vehicle.

A further enhancement may be where the at least one action includes activating at least one autonomous and/or semi-autonomous system in the primary vehicle. A further enhancement may be where the at least one action includes notifying the driver of the primary vehicle to pay attention to the operation of the primary vehicle.

A further enhancement may be where the computer system is a vehicle controller of the primary vehicle. A further enhancement may be where the computer system is a cloud-based system in communication with the primary vehicle having a vehicle controller.

A further enhancement may be where the computer system transmits the threat level of the primary vehicle to the one or more additional vehicles via vehicle to vehicle (V2V) wireless communications. A further enhancement may be where the at least one processor is further programmed to transmit at least a portion of the sensor data to the one or more additional vehicles. A further enhancement may be where the at least one processor is further programmed to transmit an updated threat level to the one or more additional vehicles.

A further enhancement may be where the sensor data includes internal data from inside the primary vehicle. A further enhancement may be where the sensor data includes external data from outside of the primary vehicle.

A further enhancement may be where the at least one processor is further programmed to determine that the one or more additional vehicles are positioned within a predetermined distance of the primary vehicle.

A further enhancement may be where the at least one processor is further programmed to determine the predetermined distance of the primary vehicle relative to the other vehicles based upon the speed of the primary vehicle In another aspect, a computer-based method for detecting distracted driving may be provided. The method may be implemented on a vehicle computer device including at least one processor in communication with at least one memory device. The method may include: (1) receiving sensor data associated with a primary vehicle; (2) determining a current condition of a driver of the primary vehicle based upon the sensor data of the primary vehicle; (3) determining a threat level for the primary vehicle based upon the current condition of the driver of the primary vehicle and the sensor data of the primary vehicle; (4) activating at least one action in the primary vehicle based upon the threat level for the primary vehicle; and/or (5) electronically transmitting the threat level of the primary vehicle to one or more additional vehicles. The method may include additional, less, or alternate actions, including those discussed elsewhere herein.

A further enhancement may be where the one or more additional vehicles are configured to activate at least one alert action to notify a driver of the corresponding vehicle of the threat level of the primary vehicle.

A further enhancement may be where the at least one action includes activating at least one autonomous and/or semi-autonomous system in the primary vehicle. A further enhancement may be where the at least one action includes notifying the driver of the primary vehicle to pay attention to the operation of the primary vehicle.

A further enhancement may be where the computer device is a vehicle controller of the primary vehicle. A further enhancement may be where the computer device is a cloud-based system in communication with the primary vehicle having a vehicle controller.

A further enhancement may be where the method includes transmitting the threat level of the primary vehicle to the one or more additional vehicles via vehicle to vehicle (V2V) wireless communications.

A further enhancement may be where the method includes transmitting at least a portion of the sensor data to the one or more additional vehicles. A further enhancement may be where the method includes transmitting an updated threat level to the one or more additional vehicles.

A further enhancement may be where the sensor data includes internal data from inside the primary vehicle. A further enhancement may be where the sensor data includes external data from outside of the primary vehicle.

A further enhancement may be where the method includes determining the one or more additional vehicles are positioned within a predetermined distance of the primary vehicle. A further enhancement may be where the method includes determining the predetermined distance of the primary vehicle relative to the other vehicles based upon the speed of the primary vehicle In a further aspect, a non-transitory computer-readable storage medium having computer-executable instructions embodied thereon may be provided. When executed by a processor coupled to at least memory device, the computer-executable instructions may cause the processor to: (1) receive sensor data associated with a primary vehicle; (2) determine a current condition of a driver of the primary vehicle based upon the sensor data of the primary vehicle; (3) determine a threat level for the primary vehicle based upon the current condition of the driver of the primary vehicle and the sensor data of the primary vehicle; (4) activate at least one action in the primary vehicle based upon the threat level for the primary vehicle; and/or (5) electronically transmit the threat level of the primary vehicle to one or more additional vehicles. The computer-executable instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the mobile device or vehicle from device details, mobile device sensors, geolocation information, image data, and/or other data.

In one embodiment, a processing element may be trained by providing it with a large sample of phone and/or online credentials with known characteristics or features. Such information may include, for example, fingerprint, device print, verification codes, PBQA, and/or passive voice analysis.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to identify the user based upon the user's device or login information. The processing element may also learn how to identify different types of accidents and vehicular crashes based upon differences in the received sensor data. The processing element may further learn how to recreate a vehicular accident based upon partial or incomplete information and determine a level of certainty that the recreation is correct. As a result, at the time of receiving accident data, providing automated reconstruction of a vehicular accident, providing automated population of insurance claim forms, providing automated contact of emergency service personnel, providing information about the vehicular accident prior to the arrival of the emergency service personnel on the scene, providing, and/or providing automated detection of vehicular accidents as they are occurring.

Additional Considerations

The present embodiments may facilitate avoiding vehicle collisions, or otherwise mitigating damage and injuries caused by vehicle collisions. Thus, vehicles configured with the functionality and computer systems may have a lower level of risk than conventional vehicles. Therefore, lower insurance premiums and/or insurance discounts may be generated and provided to insured's owning vehicles configured with the functionality and/or computer systems discussed herein.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

cesses described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A distracted driving monitoring (DDM) computer system for detecting, alerting, and correcting distracted driving, the DDM computer system comprising at least one processor in communication with at least one memory device, wherein the at least one processor is programmed to:
   receive sensor data associated with a primary vehicle;
   based upon the received sensor data, determine a current condition of a driver of the primary vehicle and a current condition of an environment in which the primary vehicle is being operated;
   determine a threat level for the primary vehicle based upon the determined current condition of the driver of the primary vehicle and the determined current condition of the environment in which the primary vehicle is being operated;
   select a notification time period from one or more notification time periods corresponding to the determined threat level;
   cause at least one action to be activated in the primary vehicle in accordance with the selected notification time period; and
   electronically transmit a notification corresponding to the determined threat level of the primary vehicle to one or more additional vehicles located within the environment in which the primary vehicle is being operated.

2. The DDM computer system of claim 1, wherein the one or more additional vehicles are configured to receive the notification and activate, based upon the received notification, at least one alert action to notify a driver of a corresponding vehicle of the one or more additional vehicles of the determined threat level of the primary vehicle.

3. The DDM computer system of claim 1, wherein the at least one action includes activating at least one autonomous and/or semi-autonomous system in the primary vehicle.

4. The DDM computer system of claim 1, wherein the at least one action is customized based upon the determined threat level and is configured to prompt the driver of the primary vehicle to direct attention to the operation of the primary vehicle.

5. The DDM computer system of claim 1, wherein the DDM computer system is a vehicle controller of the primary vehicle that is configured to:

determine a threshold of one or more threat level thresholds that the determined threat level satisfies; and electronically transmit the notification corresponding to the determined threat level based upon the determined threshold.

6. The DDM computer system of claim 1, wherein the DDM computer system is a cloud-based system in communication with the primary vehicle having a vehicle controller.

7. The DDM computer system of claim 1, wherein the DDM computer system electronically transmits the notification corresponding to the determined threat level of the primary vehicle to the one or more additional vehicles via vehicle to vehicle (V2V) wireless communications.

8. The DDM computer system of claim 1, wherein the at least one processor is further programmed to transmit at least a portion of the sensor data to the one or more additional vehicles.

9. The DDM computer system of claim 1, wherein the at least one processor is further programmed to:

evaluate the determined threat level during the operation of the primary vehicle;

determine an updated threat level based upon one or more changes to the determined threat level; and electronically transmit an additional notification corresponding to the updated threat level to the one or more additional vehicles.

10. The DDM computer system of claim 1, wherein the sensor data includes internal data corresponding to one or more sensors located inside the primary vehicle.

11. The DDM computer system of claim 1, wherein the sensor data includes external data corresponding to one or more sensors located outside of the primary vehicle.

12. The DDM computer system of claim 1, wherein the at least one processor is further programmed to determine the one or more additional vehicles are positioned within a predetermined distance of the primary vehicle.

13. The DDM computer system of claim 12, wherein the at least one processor is further programmed to determine the predetermined distance of the primary vehicle relative to the other vehicles based upon the speed of the primary vehicle.

14. A computer-based method for detecting, alerting, and correcting distracted driving, the computer-based method implemented on a distracted driving monitoring (DDM) computer device including at least one processor in communication with at least one memory device, the computer-based method comprising:

receiving sensor data associated with a primary vehicle;

determining, based upon the received sensor data, a current condition of a driver of the primary vehicle and a current condition of an environment in which the primary vehicle is being operated;

determining a threat level for the primary vehicle based upon the determined current condition of the driver of the primary vehicle and the determined current condition of the environment in which the primary vehicle is being operated;

selecting a notification time period from one or more notification time periods corresponding to the determined threat level;

causing at least one action to be activated in the primary vehicle in accordance with the selected notification time period; and electronically transmitting a notification corresponding to the determined threat level of the primary vehicle to one or more additional vehicles located within the environment in which the primary vehicle is being operated.

15. The computer-based method of claim 14, wherein the one or more additional vehicles are configured to receive the notification and activate, based upon the received notification, at least one alert action to notify a driver of a corresponding vehicle of the one or more additional vehicles of the determined threat level of the primary vehicle.

16. The computer-based method of claim 14, wherein the at least one action includes activating at least one autonomous and/or semi-autonomous system in the primary vehicle.

17. The computer-based method of claim 14, wherein the at least one action is customized based upon the determined threat level and is configured to prompt the driver of the primary vehicle to direct attention to the operation of the primary vehicle.

18. The computer-based method of claim 14, wherein the computer device is a vehicle controller of the primary vehicle and the computer-based method further comprises:

determining, via the vehicle controller, a threshold of one or more threat level thresholds that the determined threat level satisfies; and electronically transmitting, via the vehicle controller, the notification corresponding to the determined threat level based upon the determined threshold.

19. The computer-based method of claim 14, wherein the computer device is a cloud-based system in communication with the primary vehicle having a vehicle controller.

20. A non-transitory computer-readable storage medium having computer-executable instructions embodied thereon for detecting, alerting, and correcting distracted driving, wherein when executed by a processor coupled to at least memory device, the computer-executable instructions cause the processor to:

receive sensor data associated with a primary vehicle;

based upon the received sensor data, determine a current condition of a driver of the primary vehicle and a current condition of an environment in which the primary vehicle is being operated;

determine a threat level for the primary vehicle based upon determined the current condition of the driver of the primary vehicle and the determined current condition of the environment in which the primary vehicle is being operated;

select a notification time period from one or more notification time periods corresponding to the determined threat level;

cause at least one action to be activated in the primary vehicle in accordance with the selected notification time period; and electronically transmit a notification corresponding to the determined threat level of the primary vehicle to one or more additional vehicles located within the environment in which the primary vehicle is being operated.

* * * * *